United States Patent
Kim

(10) Patent No.: US 9,865,861 B2
(45) Date of Patent: Jan. 9, 2018

(54) BATTERY MODULE OF IMPROVED CONNECTION RELIABILITY AND BATTERY PACK EMPLOYED WITH THE SAME

(71) Applicant: LG CHEM, LTD., Seoul (KR)

(72) Inventor: Jihyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 31 days.

(21) Appl. No.: 14/149,062

(22) Filed: Jan. 7, 2014

(65) Prior Publication Data

US 2014/0120406 A1    May 1, 2014

Related U.S. Application Data

(63) Continuation of application No. PCT/KR2012/005366, filed on Jul. 6, 2012.

(30) Foreign Application Priority Data

Jul. 13, 2011    (KR) ........................ 10-2011-0069555

(51) Int. Cl.
*H01M 2/26* (2006.01)
*H01M 2/10* (2006.01)
*H01M 2/20* (2006.01)
*B60L 11/18* (2006.01)

(52) U.S. Cl.
CPC ........... *H01M 2/26* (2013.01); *B60L 11/1864* (2013.01); *B60L 11/1879* (2013.01); *H01M 2/1077* (2013.01); *H01M 2/202* (2013.01); *H01M 2/206* (2013.01); *B60L 2240/547* (2013.01);

(Continued)

(58) Field of Classification Search
CPC ............................................. H01M 2/22–2/28
See application file for complete search history.

(56) References Cited

U.S. PATENT DOCUMENTS

2003/0215702 A1    11/2003    Tanjou et al.
2007/0015047 A1*    1/2007    Hosaka et al. .................. 429/66
2007/0105014 A1*    5/2007    Shin et al. ..................... 429/152
(Continued)

FOREIGN PATENT DOCUMENTS

CN    101440983 A    5/2009
CN    102005557 A    4/2011
(Continued)

OTHER PUBLICATIONS

Machine translation for Park, KR 2005-015922 A.*
(Continued)

*Primary Examiner* — Angela Martin
(74) *Attorney, Agent, or Firm* — Birch, Stewart, Kolasch & Birch, LLP

(57) ABSTRACT

Disclosed herein is a battery module including a plurality of unit modules, based on battery cells which can be charged and discharged, electrically connected to each other, wherein the unit modules are electrically connected to each other in series and/or in parallel or the unit modules are electrically connected to a bus bar in series and/or in parallel, the battery module has two or more electrical connection points, and the number of electrically connected members at each of the electrical connection points is less than the total number of the electrically connected members of the battery module.

12 Claims, 4 Drawing Sheets

(52) U.S. Cl.
CPC ........ *Y02T 10/7005* (2013.01); *Y02T 10/7061* (2013.01); *Y10T 29/49108* (2015.01)

(56) References Cited

U.S. PATENT DOCUMENTS

| | | | | |
|---|---|---|---|---|
| 2007/0111089 | A1* | 5/2007 | Swan | H01M 2/024 |
| | | | | 429/160 |
| 2008/0060189 | A1* | 3/2008 | Daidoji et al. | 29/623.1 |
| 2010/0015511 | A1 | 1/2010 | Yoo et al. | |
| 2010/0190055 | A1 | 7/2010 | Khakhalev | |
| 2010/0227211 | A1 | 9/2010 | Chang et al. | |
| 2011/0052969 | A1* | 3/2011 | Cai et al. | 429/158 |
| 2012/0231300 | A1* | 9/2012 | Park | H01M 10/425 |
| | | | | 429/7 |
| 2012/0263995 | A1* | 10/2012 | Naito | H01M 2/1077 |
| | | | | 429/146 |
| 2012/0315531 | A1* | 12/2012 | Lev | H01M 2/0212 |
| | | | | 429/159 |
| 2012/0326672 | A1* | 12/2012 | Dennis | H02J 1/10 |
| | | | | 320/134 |
| 2013/0029206 | A1* | 1/2013 | Lev | H01M 2/206 |
| | | | | 429/161 |
| 2014/0050967 | A1* | 2/2014 | Fuhr | H01M 2/305 |
| | | | | 429/158 |

FOREIGN PATENT DOCUMENTS

| | | | | |
|---|---|---|---|---|
| EP | 1 901 387 B1 | | 2/2012 | |
| JP | 2003331816 A | * | 11/2003 | H01M 2/30 |
| JP | 2004-6141 A | | 1/2004 | |
| JP | 2004055492 | * | 2/2004 | H01M 2/02 |
| JP | 2004-87337 A | | 3/2004 | |
| JP | 2007-109548 A | | 4/2007 | |
| JP | 2008-66170 A | | 3/2008 | |
| JP | 2011-76776 A | | 4/2011 | |
| JP | 2011076776 A | * | 4/2011 | H01M 2/26 |
| KR | 10-2005-0015922 A | | 2/2005 | |
| KR | 2005015922 A | * | 2/2005 | H01M 2/30 |
| KR | 10-2008-0009351 A | | 1/2008 | |
| KR | 10-2008-0023182 A | | 3/2008 | |

OTHER PUBLICATIONS

Machine translation for Hosokawa et al., JP 2011-076776 A.*
Machine translation for Tanjo et al., JP 2003-331816 A.*
Supplementary Partial European Search Report for Application No. EP 12812024 dated Mar. 5, 2015.*
Chinese Office Action with English translation dated Jun. 3, 2015.
Supplementary European Search Report dated Jun. 17, 2015.

* cited by examiner

【FIG. 1】
Conventional Art
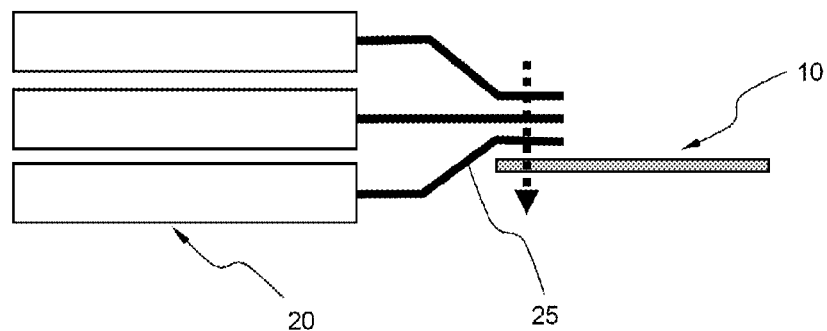
【FIG. 2】
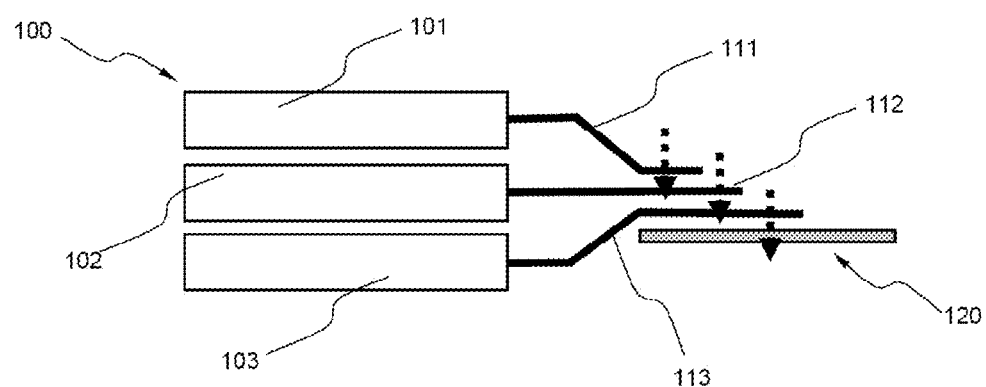

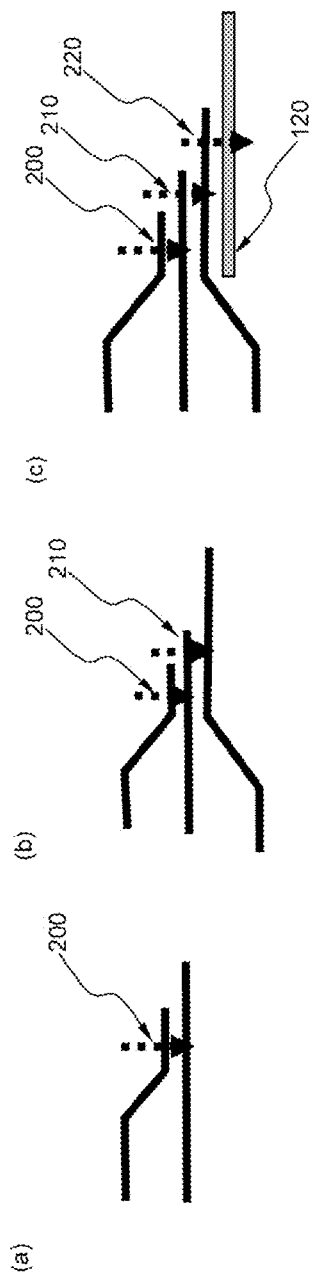
[FIG. 3]

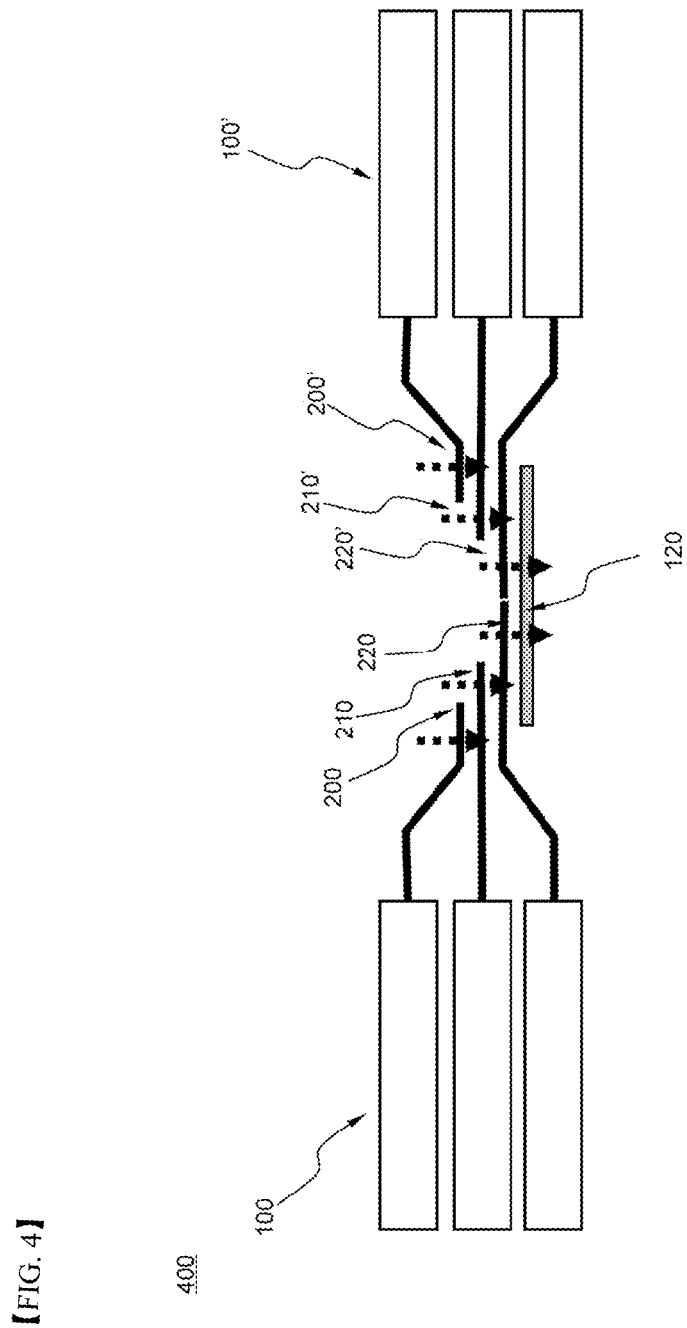
[FIG. 4]

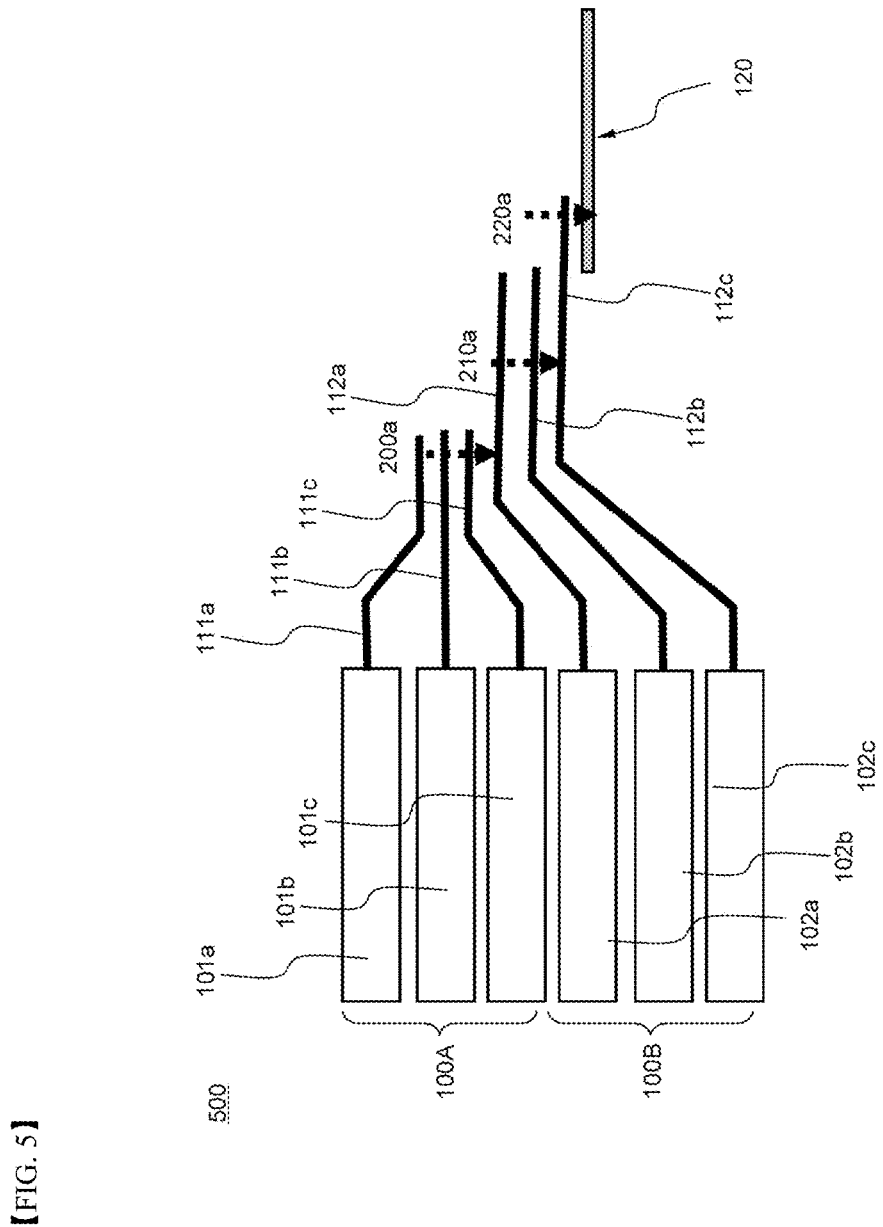

BATTERY MODULE OF IMPROVED CONNECTION RELIABILITY AND BATTERY PACK EMPLOYED WITH THE SAME

This application is a Continuation of PCT/KR2012/005366 filed on Jul. 6, 2012, which claims priority under 35 U.S.C. 119(a) to Patent Application No. 10-2011-0069555 filed in the Republic of Korea on Jul. 31, 2011, all which are hereby expressly incorporated by reference into the present application.

TECHNICAL FIELD

The present invention relates to a battery module of improved connection reliability and a middle or large-sized battery pack including the same and, more particularly, to a battery module including a plurality of unit modules, based on battery cells which can be charged and discharged, electrically connected to each other, wherein the unit modules are electrically connected to each other in series and/or in parallel or the unit modules are electrically connected to a bus bar in series and/or in parallel, the battery module has two or more electrical connection points, and the number of electrically connected members at each of the electrical connection points is less than the total number of the electrically connected members of the battery module.

BACKGROUND ART

A secondary battery, which can be charged and discharged, has been widely used as an energy source for wireless mobile devices. In addition, the secondary battery has attracted considerable attention as a power source for devices which require high output and large capacity, such as electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Such devices use a middle or large-sized battery module having a plurality of battery cells electrically connected to each other to provide high output and large capacity.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Meanwhile, a battery module mounted in a middle or large-sized battery pack is generally manufactured by stacking a plurality of battery cells with high integration in a state in which electrode terminals of adjacent ones of the battery cells are electrically connected to each other.

FIG. 1 is a perspective view typically showing an electrical connection structure of a conventional representative battery module.

Referring to FIG. 1, a battery module 50 is configured to have a structure in which electrode terminals 25 of three battery cells 20 are electrically connected to a bus bar 10 in a state in which the battery cells 20 are stacked. The three battery cells 20 are sequentially stacked and are then electrically connected to the bus bar 10, to which other battery cells are electrically connected.

As the number of the stacked battery cells is increased, thicknesses and widths of the electrode terminals and the bus bar are increased. As a result, a large amount of energy is needed during welding.

In this case, laser welding or resistance welding may not be used. Consequently, ultrasonic welding is generally used. In a case in which ultrasonic welding requiring a large amount of energy is carried out, however, ultrasonic waves may be transferred to other regions of the battery cells with the result that the battery cells may be electrically damaged, the lifespan of a welding device may be reduced, and the battery cells may be attached to the welding device.

Consequently, there is a high necessity for a battery module in which battery cells are not damaged through the use of a small amount of energy and electrical connection positions are subdivided to secure reliably connection regions with respect to which various connection methods may be used.

DISCLOSURE

Technical Problem

Therefore, the present invention has been made to solve the above problems and other technical problems that have yet to be resolved.

It is an object of the present invention to provide a battery module in which damage to battery cells is minimized during welding of the battery cells or welding between the battery cells and a bus bar through the use of a small amount of energy and various connection methods may be used.

Technical Solution

In accordance with one aspect of the present invention, the above and other objects can be accomplished by the provision of a battery module including a plurality of unit modules, based on battery cells which can be charged and discharged, electrically connected to each other, wherein the unit modules are electrically connected to each other in series and/or in parallel or the unit modules are electrically connected to a bus bar in series and/or in parallel, the battery module has two or more electrical connection points, and the number of electrically connected members at each of the electrical connection points is less than the total number of the electrically connected members of the battery module.

Generally, in a battery module, electrode terminals of unit modules are simultaneously connected to each other by welding or the electrode terminals of unit modules are simultaneously connected to a bus bar by welding in a state in which the unit modules are stacked. When the electrode terminals of unit modules are connected to each other by welding or the electrode terminals of unit modules are connected to the bus bar by welding, however, the same regions are simultaneously welded with the result that, as the number of electrically connected members is increased, the welded regions may be inevitably damaged as previously described.

On the other hand, the battery module according to the present invention is configured such that two or more electrical connection points are provided and the number of electrically connected members at each of the electrical connection points is less than the total number of the electrically connected members of the battery module. As a result, the amount of energy necessary at each position is reduced and, therefore, it is possible to reduce damage to insides and outsides of the battery cells and a welding device in addition to the electrical connection points. In addition, the number of the electrically connected members to be connected per position is reduced. Consequently, it is possible to use various connection methods, which is very preferable.

The term 'electrical connection point' used in this specification is defined as one electrical connection point in a case in which two or more welding points are formed to strengthen coupling or connection between the same electrically connected members.

In the present invention, each of the unit modules may include one battery cell or a plurality of battery cells.

In a preferred example, each of the unit modules may include one battery cell. In a case in which one battery cell constitute one unit module and electrode terminals of the respective battery cells have different electrical connection points, electrical connection points of the electrically connected members do not overlap. Consequently, it is possible to perform welding only using a small amount of energy, thereby preventing other regions of the battery cells from being affected by welding.

In another preferred example, each of the unit modules may include a combination of two or more battery cells connected to each other via one electrical connection point. For example, each of the unit modules may include two to four battery cells. According to circumstances, the battery cells in each of the unit modules may be configured to have two or more electrical connection points in the same manner as in electrical connection between the unit modules.

In the present invention, each of the battery cells may be a secondary battery having a small thickness and a relatively large width and length so as to minimize the overall size of a battery module when the battery cells are stacked to constitute the battery module. Preferably, each of the battery cells is a plate-shaped battery cell configured to have an easily stackable structure.

In a preferred example, the plate-shaped battery cell may be (a) a pouch-shaped battery cell configured to have a structure in which an electrode assembly of a cathode/separator/anode structure is mounted in a battery case formed of a laminate sheet comprising a resin layer and a metal layer and a cathode terminal and an anode terminal protrude from one side or opposite sides of the battery case or (b) a prismatic battery cell configured to have a structure in which an electrode assembly of a cathode/separator/anode structure is mounted in a prismatic battery case formed of a metal or plastic material and a cathode terminal and an anode terminal protrude from one side or opposite sides of the battery case.

In a concrete example, the unit modules may be electrically connected to the bus bar in a state in which electrode terminals of the unit modules are electrically connected to each other and two or more electrical connection points may be provided between the unit modules and between the unit modules and the bus bar.

In the above structure, on the assumption that the number of the unit modules is n and the number of the bus bar is 1, the number of the electrical connection points may be 2 to n.

In a preferred example, the number of the electrically connected members at the electrical connection points may be 4 or less. More preferably, the number of the electrically connected members at the electrical connection points is 2.

Even in a case in which a plurality of electrically connected members is provided, therefore, each of the electrically connected members may be welded only using a small amount of energy.

In another preferred example, on the assumption that the number of the unit modules is n and the number of the bus bar is 1, the number of the electrical connection points may be n.

In the above structure, the number of the electrically connected members at each of the electrical connection points may be 2 and adjacent ones of the electrical connection points may deviate from each other.

Specifically, the electrical connection points sequentially deviate from each other. Even in a case in which the electrically connected members are stacked, therefore, easy connection is achieved. In the above, that the electrical connection points deviate from each other means that the electrical connection points do not overlap. In addition, that the electrical connection points sequentially deviate from each other means that the electrical connection points are gradually distributed in one direction such that the electrical connection points do not overlap at the respective positions thereof.

In the battery module having the above structure, therefore, the electrically connected members are sequentially electrically connected to each other in a state in which the electrical connection points of the electrically connected members do not overlap based on a desired structure, thereby improving manufacturing efficiency of the battery module.

Meanwhile, in a case in which the thickness and width of the electrode terminals are too small, the magnitude of current flowing through the electrode terminals is increased and, therefore, a large amount of heat is generated. As a result, the lifespan and safety of the battery cells are lowered, which is not preferable. On the other hand, in a case in which the thickness and width of the electrode terminals are too large, sealability between the battery case and the electrode terminals of each of the battery cells is deteriorated with the result that moisture may permeate into the battery cells, which is not preferable. For example, therefore, each of the electrode terminals may have a thickness of 50 to 1000 μm and each of the electrode terminals has a width of 1 to 20 cm. However, embodiments of the present invention are not limited thereto according to the specification of the battery cells. That is, even electrode terminals having larger thicknesses and widths than conventional electrode terminals may be electrically connected to each other. The same may be equally applied to the bus bar.

Methods of easily coupling the electrically connected members at the electrical connection points are not particularly restricted. For example, the electrically connected members at the electrical connection points may be coupled to each other by one or more selected from a group consisting of bolting, riveting, crimping, soldering, laser welding, ultrasonic welding, and resistance welding.

Consequently, the electrically connected members may be coupled to each other using various methods unlike a conventional structure in which the number of stacked battery cells is increased, thicknesses and widths of the electrode terminals and the bus bar are increased with the result that only ultrasonic welding is used to achieve coupling therebetween.

In accordance with another aspect of the present invention, there is provided a battery module including a plurality of unit modules, based on battery cells which can be charged and discharged, electrically connected to each other, wherein the unit modules are electrically connected to each other in series and/or in parallel or the unit modules are electrically connected to a bus bar in series and/or in parallel, the battery module has two or more electrical connection points, a first electrically connected member and a second electrically connected member facing each other are electrically connected to each other via a first electrical connection point, and a third electrically connected member facing the first electrically connected member or the second electrically connected member is electrically connected to the first electrically connected member or the second electrically connected member via a second electrical connection point.

This battery module also provides the same effects as the above.

In accordance with another aspect of the present invention, there is provided a manufacturing method of a battery module.

In a concrete example, there may be provided a manufacturing method of a battery module configured to have a structure in which unit modules are electrically connected to a bus bar in a state in which the unit modules are sequentially stacked, the manufacturing method including, in a structure in which electrode terminals of n unit modules are electrically connected to one bus bar in a state in which the electrode terminals of the n unit modules are electrically connected to each other, (a) connecting an electrode terminal of an uppermost unit module (first unit module) of the stacked unit modules to an electrode terminal of a second unit module stacked adjacent to the first unit module to form a first electrical connection point, (b) connecting the electrode terminal of the second unit module to an electrode terminal of a third unit module stacked adjacent to the second unit module at a position deviating from the first electrical connection point to form a second electrical connection point, (c) repeatedly performing the step (b) to electrically interconnect electrode terminals of n unit modules such that an (n−1)-th electrical connection point is formed, and (d) connecting an electrode terminal of an n-th unit module to a bus bar contacting the n-th unit module while being adjacent to the n-th unit module at a position deviating from the (n−1)-th electrical connection point to form an n-th electrical connection point.

Consequently, it is possible to achieve connection between the unit modules and the bus bar only using a small amount of energy. In addition, it is possible to achieve desired electrical connection with improved efficiency using various connection methods.

Meanwhile, a middle or large-sized battery pack is manufactured using a plurality of battery cells to provide high output and large capacity. It is necessary for battery modules constituting the battery pack to exhibit higher installation efficiency, structural stability, and heat dissipation efficiency in order to secure safety of the battery pack in a limited installation space.

In accordance with a further aspect of the present invention, therefore, there is provided a middle or large-sized battery pack manufactured by combining battery modules based on desired output and capacity.

A middle or large-sized battery system according to the present invention may be manufactured by combining battery packs based on desired output and capacity. The middle or large-sized battery system may be used as a power source for an electric vehicle, a hybrid electric vehicle, a plug-in hybrid electric vehicle, or a power storage device, which has a limited installation space and is exposed to frequent vibration and strong impact in consideration of installation efficiency and structural stability as described above.

The structure and manufacturing method of such devices are well known in the art to which the present invention pertains and, therefore, a detailed description thereof will be omitted.

Effects of the Invention

As is apparent from the above description, the battery module according to the present invention is configured such that two or more electrical connection points are provided and the number of electrically connected members at each of the electrical connection points is less than the total number of the electrically connected members of the battery module. As a result, the amount of energy necessary at each position is reduced and, therefore, it is possible to minimize damage to unit modules and to improve efficiency of the battery module using various connection methods.

DESCRIPTION OF DRAWINGS

The above and other objects, features and other advantages of the present invention will be more clearly understood from the following detailed description taken in conjunction with the accompanying drawings, in which:

FIG. 1 is a perspective view showing an electrical connection structure of a conventional representative battery module;

FIG. 2 is a perspective view showing an electrical connection structure of a battery module according to an embodiment of the present invention;

FIG. 3 is a typical view showing a series of processes for connecting electrode terminals and a bus bar of FIG. 2;

FIG. 4 is a typical view showing an electrical connection structure of a battery module according to another embodiment of the present invention; and FIG. 5 is a typical view showing an electrical connection structure of a battery module according to a further embodiment of the present invention.

BEST MODE

Now, preferred embodiments of the present invention will be described in detail with reference to the accompanying drawings. It should be noted, however, that the scope of the present invention is not limited by the illustrated embodiments.

FIG. 2 is a perspective view showing an electrical connection structure of a battery module according to an embodiment of the present invention and FIG. 3 is a typical view showing a series of processes for connecting electrode terminals and a bus bar of FIG. 2.

Referring to these drawings, a battery module 300 is configured to have a structure in which three battery cells 100 are electrically connected to a bus bar 120 in a state in which the battery cells 100 are sequentially stacked. Electrode terminals of the three pouch-shaped battery cells 100 are electrically connected to the bus bar 120 by welding in a state in which the electrode terminals of the three pouch-shaped battery cells 100 are electrically connected to one another. The number of electrical connection points is three.

Specifically, an electrode terminal 111 of the uppermost battery cell (first battery cell) 101 of the stacked battery cells 100 is connected to an electrode terminal 112 of a second battery cell 102 stacked adjacent to the first battery cell 101 to form a first electrical connection point 200.

At a position deviating from the first electrical connection point 200, i.e. a position spaced apart from the first electrical connection point 200 by a predetermined distance, the electrode terminal 112 of the second battery cell 102 is connected to an electrode terminal 113 of a third battery cell 103 stacked adjacent to the second battery cell 102 to form a second electrical connection point 210.

Subsequently, at a position deviating from the first electrical connection point 200 in the same manner, the electrode terminal 113 of the third battery cell 103 is connected to the bus bar 120 contacting the third battery cell 103 while being adjacent to the third battery cell 103 to form a third electrical connection point 220.

FIG. 4 is a typical view showing an electrical connection structure of a battery module according to another embodiment of the present invention.

Referring to FIG. 4 together with FIG. 2, the number of electrical connection points is six in a structure in which electrode terminals of six battery cells 100 and 100' are electrically connected to one bus bar 120 by welding in a state in which the electrode terminals of the six battery cells 100 and 100' are electrically connected to one another.

In this case, positions of the electrical connection points between the three battery cells 100 and the three battery cells 100' sequentially deviate from the bus bar 120.

FIG. 5 is a typical view showing an electrical connection structure of a battery module according to a further embodiment of the present invention.

Referring to FIG. 5, two unit modules 100A and 100B include three stacked battery cells 101a, 101b, and 101c and three stacked battery cells 102a, 102b, and 102c, respectively.

Electrode terminals 111a, 111b, and 111c of the battery cells 101a, 101b, and 101c of the first unit module 100A are connected to an electrode terminal 112a of the uppermost battery cell 102a of the second unit module 100B to form a first electrical connection point 200a.

Subsequently, at a position deviating from the first electrical connection point 200a, the above electrode terminals are connected to the electrode terminals 112b and 112c of the other battery cells 101b and 101c of the second unit module 100B to form a second electrical connection point 210a and then the above electrode terminals are connected to a bus bar 120 contacting the electrode terminal 112c of the lowermost battery cell 102c of the second unit module 100B while being adjacent to the electrode terminal 112c of the lowermost battery cell 102c of the second unit module 100B to form a third electrical connection point 220a.

In the electrical connection structure of FIG. 5, the battery cells 101a, 101b, and 101c constituting the unit module 100A are electrically connected to one another via one electrical connection point as shown in FIG. 1. Electrical connection of the unit module 100B is achieved in the same manner.

In the battery module having the above structure, therefore, electrical connection among members to be electrically connected is achieved without overlap of electrical connection points based on a desired structure, thereby improving manufacturing efficiency of the battery module.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising a plurality of unit modules, based on battery cells which can be charged and discharged, electrically connected to each other, wherein the unit modules are electrically connected to a bus bar in series and/or in parallel, the battery module has two or more electrical connection points, and the number of electrically connected members at each of the electrical connection points is less than the total number of the electrically connected members of the battery module, wherein each of the battery cells is a plate-shaped battery cell configured to have an easily stackable structure, wherein the plate-shaped battery cell is
(a) a pouch-shaped battery cell configured to have a structure in which an electrode assembly of a cathode/separator/anode structure is mounted in a battery case formed of a laminate sheet comprising a resin layer and a metal layer, and a cathode terminal and an anode terminal protrude from one side or opposite sides of the battery case, or
(b) a prismatic battery cell configured to have a structure in which an electrode assembly of a cathode/separator/anode structure is mounted in a prismatic battery case formed of a metal or plastic material, and a cathode terminal and an anode terminal protrude from one side or opposite sides of the battery case,
wherein the unit modules are electrically connected to the bus bar in a state in which electrode terminals of the unit modules are electrically connected to each other, and two or more electrical connection points are provided between the unit modules and between the unit modules and the bus bar,
wherein, the number of the unit modules is n and the number of the bus bar is 1, the number of the electrical connection points is 2 to n,
wherein two or more unit modules are sequentially stacked, and stacked unit modules being placed at one end of the bus bar has one electrical connection point formed by directly welding the electrode terminal of the one unit module to the bus bar and other electrical connection points formed by welding between the electrode terminals of adjacent unit modules such that the electrical connection points sequentially deviate so as to not overlap each other, and
wherein, of the two or more unit modules, the bus bar is directly connected to only one unit module of the two or more unit modules.

2. The battery module according to claim 1, wherein each of the unit modules comprises one battery cell.

3. The battery module according to claim 1, wherein the number of the electrically connected members at the electrical connection points is 4 or less.

4. The battery module according to claim 3, wherein the number of the electrically connected members at the electrical connection points is 2.

5. The battery module according to claim 1, wherein, on the assumption that the number of the unit modules is n and the number of the bus bar is 1, the number of the electrical connection points is n.

6. The battery module according to claim 1, wherein each of the electrode terminals has a thickness of 50 to 1000 μm.

7. The battery module according to claim 1, wherein each of the electrode terminals has a width of 1 to 20 cm.

8. The battery module according to claim 1, wherein the electrically connected members at the electrical connection points are coupled to each other by one or more selected from a group consisting of bolting, riveting, crimping, soldering, laser welding, ultrasonic welding, and resistance welding.

9. A battery module comprising a plurality of unit modules, based on battery cells which can be charged and discharged, electrically connected to each other, wherein the unit modules are electrically connected to a bus bar in series and/or in parallel, the battery module has two or more electrical connection points, a first electrically connected member and a second electrically connected member facing each other are electrically connected to each other via a first electrical connection point, and a third electrically connected member facing the first electrically connected member or the second electrically connected member is electrically connected to the first electrically connected member or the second electrically connected member via a second electrical connection point, wherein the number of electrically connected members at each of the electrical connection points is less than the total number of the electrically connected members of the battery module, wherein the first electrical connection point or the second electrical connection point is formed by directly welding an electrode terminal of the one unit module to the bus bar and another electrical connection point is formed by welding between the electrode terminals of adjacent unit modules such that the electrical connection points sequentially deviate so as to not overlap each other, and wherein, of the plurality of unit modules, the bus bar is directly connected to only one unit module of the plurality of unit modules.

10. A manufacturing method of a battery module configured to have a structure in which unit modules are electrically connected to a bus bar in a state in which the unit modules are sequentially stacked, the manufacturing method comprising:

in a structure in which electrode terminals of n unit modules are electrically connected to one bus bar in a state in which the electrode terminals of the n unit modules are electrically connected to each other, (a) connecting an electrode terminal of an uppermost unit module (first unit module) of the stacked unit modules to an electrode terminal of a second unit module stacked adjacent to the first unit module to form a first electrical connection point;

(b) connecting the electrode terminal of the second unit module to an electrode terminal of a third unit module stacked adjacent to the second unit module at a position sequentially deviating from the first electrical connection point to form a second electrical connection point that does not overlap with the first electrical connection point;

(c) repeatedly performing the step (b) to electrically interconnect electrode terminals of n unit modules such that an (n−1)-th electrical connection point is formed; and (d) connecting an electrode terminal of an n-th unit module to a bus bar contacting the n-th unit module while being adjacent to the n-th unit module at a position deviating from the (n−1)-th electrical connection point to form an n-th electrical connection point, wherein, of the n unit modules, the bus bar is directly connected to only the n-th unit module, and wherein the number of electrode terminals at each of the electrical connection points is less than the total number of the electrode terminals of the battery module.

11. A battery pack of high output and large capacity comprising two or more battery modules according to claim 1 based on output and capacity.

12. The battery pack according to claim 11, wherein the battery pack is used as a power source for an electric vehicle, a hybrid electric vehicle, a plug-in hybrid electric vehicle, or a power storage device.

\* \* \* \* \*